(No Model.)
E. HESKETH & A. MARCET.
SAFETY DEVICE.
No. 533,806. Patented Feb. 5, 1895.
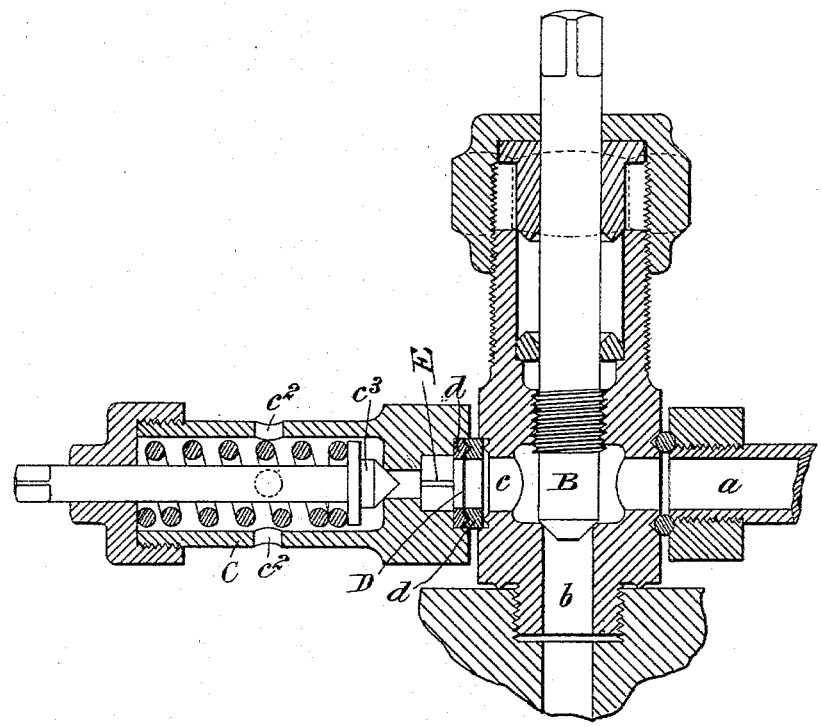
Witnesses
George Baumann
Edith J. Griswold
Inventors
Everard Hesketh
Alexander Marcet
By their Attorneys
Howson and Howson

UNITED STATES PATENT OFFICE.

EVERARD HESKETH AND ALEXANDER MARCET, OF LONDON, ENGLAND, ASSIGNORS TO THE I. & E. HALL, LIMITED, OF SAME PLACE.

SAFETY DEVICE.

SPECIFICATION forming part of Letters Patent No. 533,806, dated February 5, 1895.

Application filed May 1, 1894. Serial No. 509,676. (No model.) Patented in England July 25, 1891, No. 12,676, and in Victoria December 2, 1892, No. 10,194.

*To all whom it may concern:*

Be it known that we, EVERARD HESKETH and ALEXANDER MARCET, engineers, subjects of the Queen of Great Britain and Ireland, residing at 23 St. Swithin's Lane, in the city of London, England, have invented certain Improvements in Machinery or Apparatus for Producing Cold by the Employment of Carbonic Anhydride, (for which we have obtained patents in Great Britain, No. 12,676, dated July 25, 1891, and in Victoria, No. 10,194, dated December 2, 1892,) of which the following is a specification.

This invention relates to improvements in machinery or apparatus for producing cold by the compression and expansion of a fluid such as for instance carbonic anhydride ($CO_2$).

In such apparatus it is usual to employ a screw down valve by which the passage from the compressor to the condenser can be closed when necessary. If the compressor be put into operation when the said valve has been inadvertently left closed the continued working of the compressor will eventuate in such a high pressure being gained as to cause damage to the apparatus.

It has been proposed to use a safety valve to relieve this pressure but it has been found impracticable to provide one of the ordinary construction which is perfectly tight under the normal working pressure. According to this invention we provide a disk or piece of material which will withstand the normal working pressure but which will rupture and relieve undue pressure should it be attained from the aforesaid cause. Copper is we believe the most suitable material of which to form the said disk or piece and there may be used therewith a safety-valve of the ordinary description which when rupture has taken place will sufficiently well retain the gas in the system but allow the relief of the excess pressure.

The accompanying drawing shows in section an arrangement according to this part of our invention.

The compressor outlet passage is situated at $a$, and $b$ is the passage controlled by the screw down valve B the orifice $c$ leading to the outlet passages (or passage) $c^2$ in the cap piece C containing the safety-valve $c^3$. In the orifice $c$ are blocks $d$ holding between them, by a tight joint as shown, the piece D of copper or like material which is capable of withstanding the normal working pressure but will rupture under undue pressure as aforesaid and allow the gas to open the valve $c^3$ and pass off by the passages $c^2$. A cross-bar E between the disk and orifice leading to the valve $c^3$ prevents the piece of burst disk from closing this orifice. The valve $c^3$ will return to its seat when excess of pressure is relieved and retain the gas sufficiently for working the apparatus until the disk D can be conveniently replaced. Although we have shown the disk D as situated beyond the valve it will be evident that it may be between the valve and the compressor outlet passage if desired.

Having now particularly described and ascertained the nature of our said invention and in what manner the same is to be performed, we declare that what we claim is—

In machinery or apparatus for producing cold, the combination of a disk in a relief outlet, the said disk adapted to burst from undue pressure, with a safety-valve beyond the disk, and a cross-bar between the disk and the safety-valve to prevent the disk when burst from closing the outlet to the safety-valve, substantially as set forth.

In testimony whereof we have signed our names to this specification in the presence of two subscribing witnesses.

E. HESKETH.
ALEX. MARCET.

Witnesses:
H. D. HOSKINS,
PERCY R. SOELLRING.
*Both of 31 Lombard Street, London, E. C.*